UNITED STATES PATENT OFFICE.

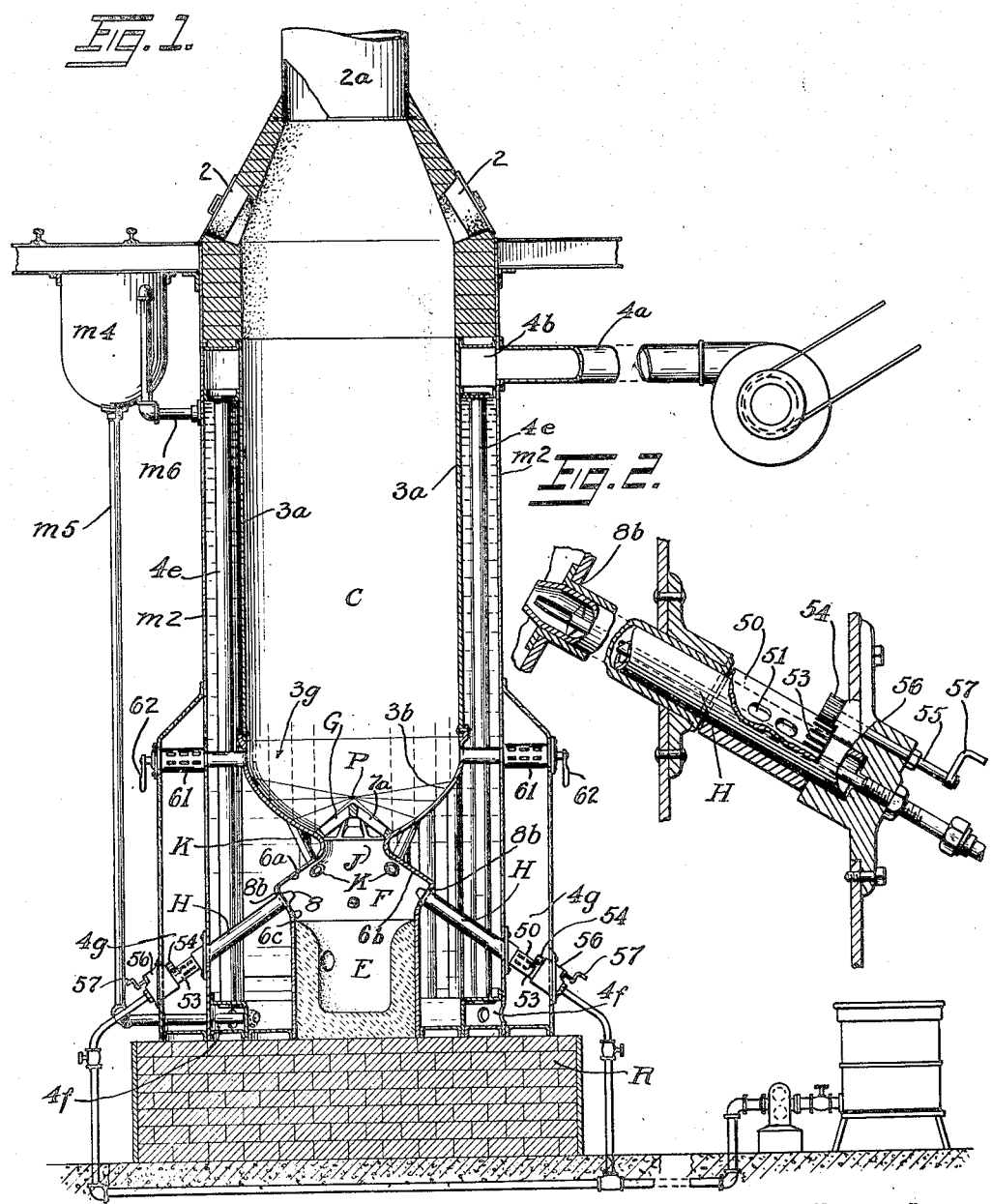

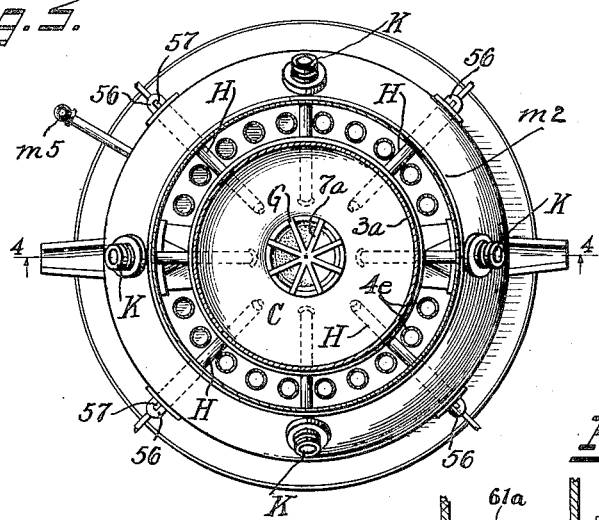
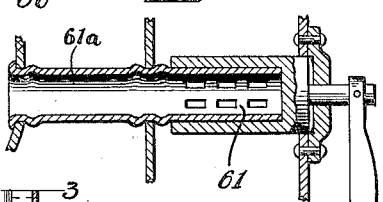
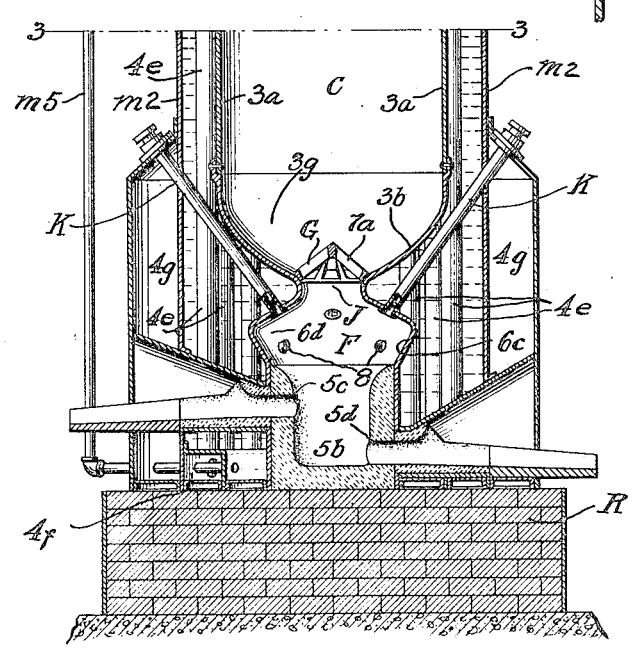

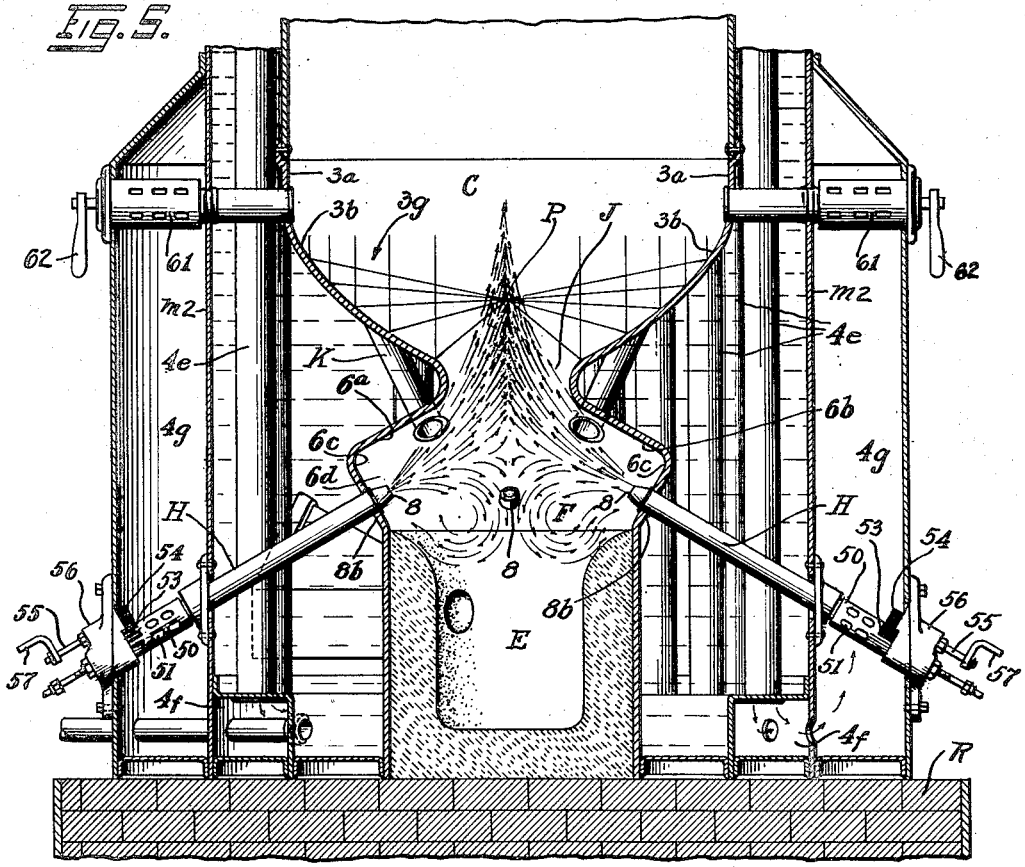

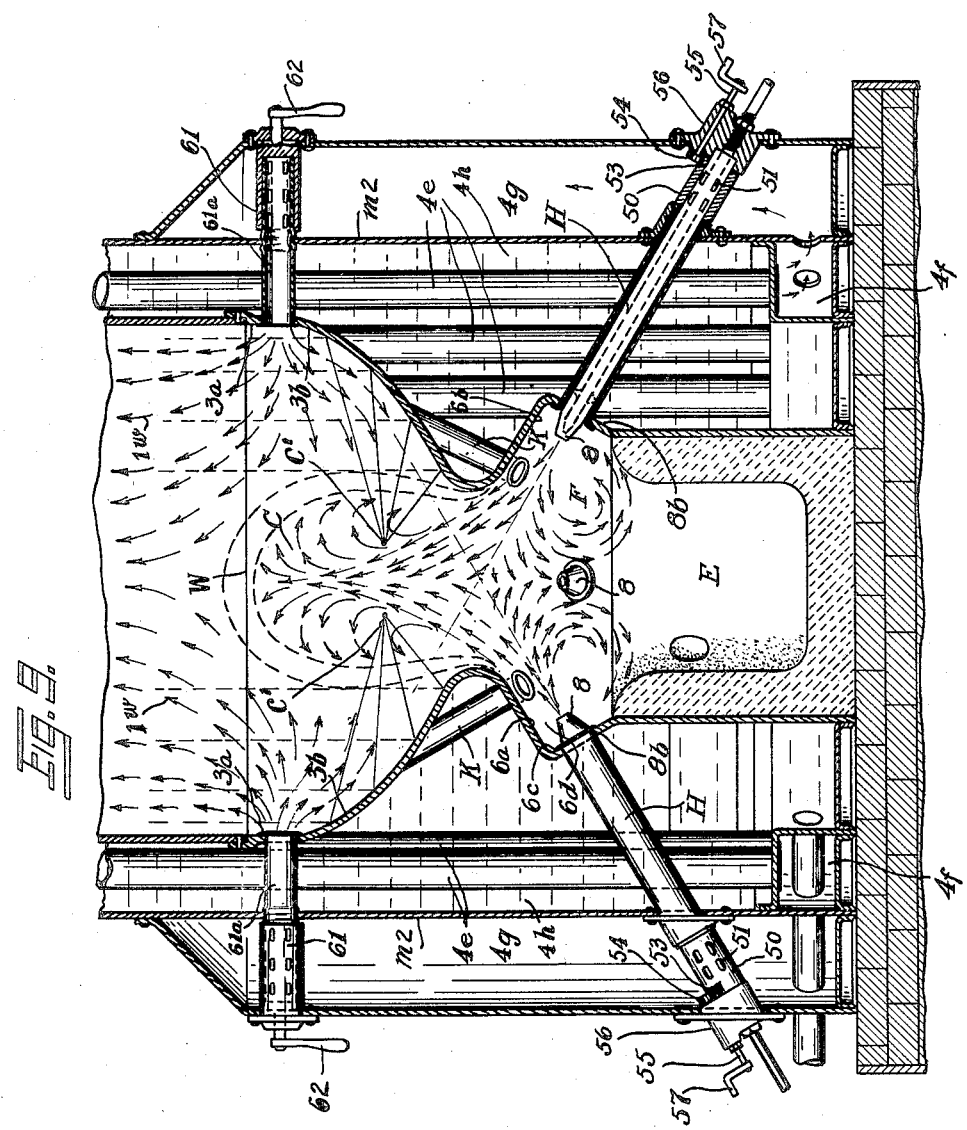

RANDOLPH G. WARD, OF NEW YORK, N. Y., ASSIGNOR TO INDEPENDENT MINES SMELTING COMPANY, INC., OF NEW YORK, N. Y., A CORPORATION OF DELAWARE.

SMELTING-FURNACE.

1,348,525.        Specification of Letters Patent.        Patented Aug. 3, 1920.

Application filed June 19, 1918. Serial No. 240,860.

*To all whom it may concern:*

Be it known that I, RANDOLPH G. WARD, a citizen of the United States, residing in New York, in the county of New York and State of New York, have invented certain new and useful Improvements in Smelting-Furnaces, of which the following is a specification.

My present invention relates to furnaces for use in smelting ores of precious and rare metals, and for the general reduction of ores where a gaseous or vaporized fuel is used, and in many respects is similar to the subject-matter set forth in U. S. application Serial No. 123,612, filed October 4, 1916.

The important feature of my device consists in the provision of an ore carrying shaft having a curved or parabola-shaped furnace floor or hearth for supporting the ore above an open and unobstructed combustion chamber, said combustion chamber being located beneath the furnace hearth, whereby such parabola-shaped floor efficiently supports and automatically sustains the furnace charge above such combustion chamber.

Another important feature of my device consists of a means affording effective utilization of fluid fuels, such as a gas or vaporized mixture of oil and air, and consists in opposed and upwardly inclined burners projecting into said combustion chamber and so located and alined as to focalize the separate flames from said burners into the base of the ore charge, the said flames passing upwardly through the hearth and concentrating in the base of the ore charge, and through such concentration of the flame at the base of the ore charge, causing the melting of such charge within the fusion zone, and the consequent coöperation of the ore charge itself upon the above noted parabola-shaped hearth, whereby to bring down the ore charge gradually into the focal flame point through the gradual reduction of the ores and the natural coöperation of the curved sustaining faces of such hearth.

Another important feature in my device relates to the method and position whereby an oxidizing air charge is supplied to the base of the ore charge, such charge being directed so as to flow in through twyers located at a point above the hearth and surrounding the fusion and heat zone so that such oxidizing air charge is introduced at the proper point without being forced into the ore charge through the fusion zone; which hampers combustion and reduces its oxidizing energy.

Another important feature of my device consists in an arrangement of a system of metal framing and walls, provided with water-cooling, water-circulating, and air heating means; the said air heating feature of my device being designed to lessen the quantity of water required and to increase the efficiency of the smelter through the conservation of the heat units supplied thereto.

Another feature of my device is the adaptation of a temporary fusible hearth-grate for the purpose of charging the furnace or air shaft only and until the operation of blowing-in or inaugurating the operation of the furnace has taken place, such grate being located over the throat and upon the hearth of the charge chamber, and being of a fusible or analogous reducible material, of any suitable form for the purpose, but being so designed as to be open in its pattern, whereby the fusing flames may pass upwardly beyond the hearth opening and into the ore charge thereby permitting the partial fusing of such charge, making it adhesive in the mid-portion of the lower section thereof before the support is reduced or melted away.

Generally the improved smelting furnace illustrated in the accompanying drawings, may be considered as belonging to a class quite distinct and different from the known cupola form of smelting furnace, the main characterization of my device being in the system and arrangement of a walled-body, provided with wall-cooling water-circulating, air heating, and flame concentrating means and apparatus, these being organized for conjoint operation in a continuous and regulable manner, whereby to carry on the smelting operation in a restricted area or fusion zone, said zone being inclosed within the interior of the body or mass of the ore charge itself thereby forming and inclosing a continuously self-renewing wall for such fusion zone, the outer zones of which become, automatically, the heated zones for the downwardly feeding ore charge.

In the accompanying drawings forming a part of this specification, Figure 1 is a sectional view of the complete furnace ready for use;

Fig. 2 is a sectional view of one of the burners;

Fig. 3 is a section on the line 3—3 of Fig. 4;

Fig. 4 is a section on the line 4—4 of Fig. 3; showing the lower part of the furnace and more especially showing the arrangement of the telescopic peepers;

Fig. 5 is an enlarged section of the lower part of the furnace illustrated in Fig. 1, and more especially showing the arrangement of the upper air feeds;

Figs. 6 and 7 are fragmental sections showing a telescopic peeper in detail;

Fig. 8 is a fragmental section showing the upper air feed in detail;

Fig. 9 is a section similar to the section of Fig. 5 of a modification.

Similar reference characters designate like parts in all the views.

The drawings illustrate the working chambers and also various details inclosed within or by a framework or casing which is arranged to be water-cooled throughout. These various features, together with the preferred organization of wall-plates, water and air chambers or spaces, circulating and heating pipes, and other and similar features, are clearly represented by the lines of the drawings, Figs. 1 to 8, inclusive, so that only a brief description thereof in detail will be now required, especially since those improvements, so far as the same are not defined in the claims hereof, are intended to constitute in part the subjects-matter of other applications to be filed by me and concurrently pending herewith.

The furnace is shown in Figs. 1, 4, 5, resting upon a base or foundation, R, which, in practice, may be of any suitable and convenient character. The framework is arranged to inclose a charge-chamber, C, and when made in this form, consists of a water-jacket shell comprising the walls $m^2$. A series of vertically disposed water-cooling and air-heating flues, $4^e$, are located between the water-jacket walls $m^2$ of the smelter shaft, or charge-chamber, C, which is the inner ore-carrying shaft of the smelter, and the side-walls $3^a$ thereof shown as vertical. At the base of the chamber C, the wall $3^b$, is inwardly converging upon curved lines, to form the charge-supporting hearth $3^g$ of the furnace. This hearth, comprising the walls $3^a$ and $3^b$, Figs. 1, 4, and 5, is calculated to support and automatically sustain the ore in the furnace,—when fully charged and during operation,—at and above a certain effective focal point, as P, Figs. 1 and 5, and for this purpose said hearth-wall $3^b$, is preferably of the shape in profile, of a parabola. An opening, J, in the furnace-hearth leads directly down into the unobstructed combustion chamber, F, which is thus located below the inwardly converging curved or parabola shaped base or hearth of the ore-carrying shaft of the furnace. Said hearth-opening will usually be temporarily closed by a charging grate as G, while charging and blowing-in the furnace. The crucible of the furnace is designated generally by $5^b$, having the slag and bullion tap holes $5^c$ and $5^d$, respectively. During the operation the tap holes will be partly or wholly stopped from time to time as occasion may require. A series of oppositely-disposed and upwardly inclined burners, H, supply the gas or vaporized mixture of oil and air required as fuel; these burners are shown fitted with special air controlling devices as hereinafter more fully described. A series of withdrawable telescope peepers K, are provided through which to observe the state of the combustion and thus aid in controlling the operation of the furnace.

The charging grate, G, may be made of iron, or in some cases of slag cast into shape and placed temporarily over the opening J in the base of the ore-carrying shaft, and above the combustion chamber F; to prevent the ore passing through such opening into said chamber until such time as the shaft shall be sufficiently filled with ore to develop, by its weight and downward pressure, the inward jam or thrust resulting from the active principles embodied in the inwardly curved or parabola shaped converging hearth-wall $3^b$; afterward the grate G will be melted out during an early stage of the process of blowing-in the furnace, and is not replaced again until the furnace is blown out and has to be recharged. The usual ore-charging doors 2, may be located at or near the top of the furnace, which may also have a suitable smoke flue or stack, as $2^a$. The main air-pipe $4^a$ has a branch, $4^b$, from which the air passes through the flues $4^e$, to the chambers $4^f$, and $4^g$, and thence through the burners H, to the combustion chamber F. A water tank $m^4$, may be located above the level of the upper ends of the water-jackets of the furnace, and may be connected therewith by the pipes $m^5$ and $m^6$, for securing a circulation of water in the water-jacket spaces of the furnace framework.

In the preferred embodiment of my invention herein illustrated, one of the important features consists in the charge-supporting and centering furnace-hearth G. This hearth is shown forming an inwardly converging base for the furnace shaft or chamber C, which is arranged and adapted for supporting and sustaining the charge of ore,—when the furnace is in operation,—above an open and unobstructed burner chamber, as F, located below said hearth.

The charge-chamber, C, is herein shown provided with a furnace-hearth which may be described as comprising a charge-centering hearth-wall 3$^b$, having centrally thereof a hearth-opening J, while the walled-in burner-chamber, F, is located below and is wider than said hearth-opening. The upper walls 6$^a$, 6$^b$, of the burner-chamber are joined (preferably in an integral manner) with said bottom-walls of the charge-chamber and along the sides of said hearth-opening. A plurality of suitable air-jet burners H, are arranged in oppositely coacting pairs, one burner on either side of the hearth-opening,—and have their jet-ends as at 8, (Figs. 1, 3, and 4) located under, and hence are protected by, said upper walls of the burner-chamber from the fused metals and slags that fall through the hearth-opening and thence through the burner-chamber F into the receptacle E. Said jet-ends are each shown positioned to enter the burner-chamber on an upward incline, and this incline or angle should be such that each burner operating separately will be directed to that side of said hearth-opening which is opposite thereto, and above such hearth into the ore charge. The burners are positioned so that the jets therefrom combine and thus form a zone of intense combustion above the position of the burners remote from the individual burners and within the ore charge. Also each of the several burners or one burner of each co-acting pair, should have means,—such as a valve or the like,—for separately regulating the operation thereof. The burners H are each provided (see Fig. 2) with an outer rotatable sleeve 50 which has openings 51 that coöperate with openings in the burner bodies H, and have a toothed formation 53 thereon to mesh with the pinion 54 mounted on the shaft 55 journaled in the wall portion 56 and having a crank 57 on the outer side thereof for the manipulation thereof. These several features and arrangements will now be evident from Figs. 1 and 2 by comparison with the other views and the description thereof.

One of the important improvements in combination with the use of burners located as described in the foregoing and in conjunction with the hearth shown in connection herewith, is that owing to the inclination of the fuel jets 8, the axis thereof is so inclined as to direct the combustible mixture upward and into the base of the ore charge adjacent the curved or parabola shaped sides thereof, so that upon focalization at the impact point of the air and fuel mixture, the flame is concentrated into an intense heat upon the ore and within the shaft, at or about the focal point of the parabola and above such floor of the hearth formed by such parabola.

The smelting flame is carried upward, under, and ultimately into the ore charge contained in the ore carrying shaft, as indicated for instance, in Figs. 5 and 9, and the effect of this concentrated flame is exerted upon a conical or wedge-shaped core, which upon softening and melting is borne inwardly and downwardly by the pressure of the charge above in coaction with the parabola-shaped hearth. After the furnace has been fully blown in and is operating, the fusion zone portion of the charge becomes somewhat spherical in form, as indicated at C in Fig. 9, owing to the reverberatory action of the impinging flame.

In Fig. 9, there will be noted, in addition to the substantially spherical fusion zone C, that there is located, immediately adjacent thereto, the plastic zone W, which itself is immediately surrounded by a zone more properly known as the heated zone and through which heated zone there is passed, by means to be later described, in sufficient quantities, an oxidizing air charge, the flow of which through the ore charge at this point is indicated by the arrows 1$^w$.

It will be noted that the introduction tubes generally denoted by 61$^a$, Figs. 1, 5, 8, and more especially 9, are so located as to surround the fusion zones C and W, and that therefore the oxidizing air charge introduced therethrough is compelled to enter the heated ore charge at the desired point that immediately surrounds the said zones and adjacent the focal flame points C'.

The introduction of the oxidizing air charge at this particular point, and into the ore charge direct rather than through the combustion and fusion zones, obviates the difficulty heretofore experienced when the oxidizing air charge is introduced through the combustion space and fusion zone and thence into the ore charge.

When the circuit of the hearth is circular as shown in Fig. 3, (or approximately of that form), the supporting power of the hearth as compared with the closing-in effect thereof upon the bottom portion of the charge, will naturally be greater and hence with a circular " circuit " form of hearth the central opening may ordinarily be made relatively larger as shown in Fig. 9, than when the elongated form of circuit is employed.

For convenience of description, I have described the furnace-hearth as consisting of a bottom wall which is adapted by construction and arrangement for both supporting the charge and for closing-in, or " centering " the material, and hence this bottom member may be properly designated as a " charge-centering " hearth. It will be understood, however, that in practice this form of furnace-hearth G will be of such a width in proportion to the width of the charge-chamber C, (this chamber being sometimes designated as the "shaft" or "ore-shaft"), of such a degree of inclination, and arranged with a hearth-opening of such width and proportion, as will operate in any given case,—in view of the nature of the material then being treated,— to support the charge of ore or broken rock within the charge-chamber during the time while the mid-part of the load which is directly over the hearth-opening and between the oppositely disposed parts of the furnace-hearth wall or walls is being smelted out. Thus the weight of the charge operating in connection with the charge-centering bottom wall, gradually and properly closes together the lower part of the charge in a progressive manner as the fusing operation proceeds.

The cross section form or outline of the hearth-wall is designated as the profile thereof, and this profile, as the line $3^b$, Fig. 1, is inclined downwardly toward the hearth-opening, and is preferably, curved, so that the hearth will be not only inclined but also concaved, and thus will not only support the charge, but will also,—and simultaneously close together a lower and outer portion of the charge during the fusing away of the mid-part of such lower portion within a central zone that is directly above the hearth-opening and also directly between opposite portions of the hearth-wall circuit.

In connection with the charge-supporting and centering hearth-walls and the elongated hearth-opening between them, the series of burners are arranged in pairs which are located, each pair transversely of the hearth-opening, and the two burners of a pair are arranged in transverse positions relatively to each other while each is directed to said hearth-opening, and is separately regulable by adjustment or otherwise for properly combining the flames therefrom and then, or thereby, projecting the combined flame,—which then constitutes a fusing - flame, — upwardly through the hearth-opening into a fusing-zone which is above said hearth-opening and within the base of the ore-charge. In some instances, such a regulation may be effected by an adjustment of one burner of the pair relatively to the other, and thus also regulate both the position and the intensity of the combined flame, or of the hottest region thereof, relatively,—as to transverse direction,—to said bottom opening and fusing-zone. In other words, if one of the burners H is regulated by the crank 57 to vary the intensity of the flame, the other burner H remaining constant at the time, the hottest zone will be shifted either toward or away from the first burner H, and obviously if one pair of opposing burners H is regulated to vary their intensity while an adjacent pair remain constant, the hottest zone will be shifted either toward or away from the first said pair of burners.

The combustion-chamber, F, and the construction and arrangement thereof with and relatively to the furnace-hearth, the metal-receptacle, the jet-burners and the water walls, constitutes one of the leading features of my present improvements. In these arrangements, the receptacle F is located relatively close up underneath the hearth-opening, J, while the burner-chamber itself is broadened out into the two oppositely-disposed bays, as $6^e$, located beyond or outside of the normal range or path of the falling stream of metal and slag. Said bays or side portions of the burner-chamber are indicated at $6^e$, Fig. 5, being located under the inclined lower walls, $6^a$, respectively, of the water-cooled furnace-hearth; thus the bay space $6^d$ is bounded or closed in by the angularly-disposed walls, $6^a$, $6^e$, of which the latter, $6^e$, constitutes a wall-zone for receiving a series of inclined burners, as H, which are or may be removably and adjustably fixed therein by means of a suitable connection at $8^h$.

The air-and-fuel jets, as H, issue with a relatively high velocity, and have a spreading form as they come together and so mingle and combine in an intense combustion which, though beginning in the chamber F does not reach its maximum until carried well up through the hearth-opening J and into the fusing-zone within the hearth-zone of the charge-chamber. In practice the impact of said spreading streams or jets, while operating to direct the main portion thereof upwardly in a concentrated manner, also diverts or deflects some portions laterally and also downwardly, with the result of filling the chamber C with mixing gases and flame having a sufficient heat to prevent a too large upward radiation of heat from the mass of molten metal, or of metal and slag in the receptacle E.

In Figs. 1, 4, 5, 8, and 9, at 61 and 62, there is shown a means for oxidizing the ore content of the charge, consisting in an air controlling and delivering means whereby air may be delivered in the desired quantities into the interior and at the base of the charge, the introduction of such oxidizing air charge being preferably located at a point above the parabola-shaped hearth and also at such location as will cause such incoming oxidizing air charge to surround the fusion zone. This arrangement permits of the proper proportions of air to be introduced at the required point and obviates the necessity of having the air pass through the fusion zone and further does away with the hampering of combustion as occurs by the well-known means heretofore employed in other known types of stack smelters.

The oxidizing air charge controlling mechanism consists in the arrangement which is so mounted as to pierce the chamber 4ᵍ, the air heating and water cooling space 4ʰ, and also the hearth-wall 3ᵃ, the points of entry of the air duct through the slots $m^2$ and 3ᵃ being properly sealed against leakage of water from the water-cooling space 4ʰ. The rear end of the introduction tubes 61ᵃ are provided with air port controlling means whereby operation of the handle control 62 the ports in the air duct 61 are opened or closed and the desired amount of air is taken from the chamber 4ᵍ. The influx of the oxidizing air charge into the ore charge chamber is shown by the arrows 1ʷ, Fig. 9, and it will be noted that such charge is so introduced as to entirely surround the flame, fusion and heat zone located above the hearth and within the base of the ore charge.

Thus the arrangements and modes of action and coaction herein set forth, effect the smelting of the ores in a fusing zone which is within the described hearth-zone, and the melted materials after descending through a flame-filled chamber are then collected in a receptacle and there subjected to a protecting flame and heating from above, thereby effecting, in some respects, a continuation of the reduction-treatment of the melted materials. This supplemental treatment, therefore, is analogous to the operations in an air-furnace of the well-known reverberatory kind, since the flame-filled chamber F serves as a protecting roof above the "bath" in said receptacle E.

The proper proportioning of gas and air,—or of air and oil, as the case may be,—may be readily determined and adjusted by means of the very simple regulating mechanism of the burners as shown. In practice, the operation of the furnace may be readily ascertained from time to time by means of the peep-holes illustrated. These peep-hole devices are designated as telescopic, since they are tubular and are arranged to be easily withdrawn for adjustment or repair.

In Fig. 5, it will be noted that the inner and concaved surfaces of the oppositely disposed hearth-walls 3ᵇ, respectively, are located in substantial coincidence with symmetrically and oppositely disposed arcs. In this peculiar organization of the furnace-hearth and the several features and components thereof, it will be understood that the operation of the furnace as regards these features is facilitated by the maintaining of the said metal-surface hearth-walls in a relatively cool condition for which purpose the necessary circulating water should be provided, thereby maintaining a constant status or relationship between the hearth-walls and the material directly supported by and sliding on those walls.

In the normal operation of the furnace the charge of material in the furnace-chamber is supported by the load-carrying base or hearth-walls, as 3ᵇ, and the mid-portion of the material is prevented from falling through the bottom opening, J, by the fusing together of the material immediately joining the focal zone, this resisting effect taking place in connection with the peculiar supportive action resulting from the construction and relative disposition of the said oppositely disposed bottom walls.

In carrying out that part of my invention, which relates to the blowing-in of the furnace,—to begin the smelting of the charge,—the perforated and fusible charge-supporting grate is placed and extends over said hearth-opening for initially supporting a mid-portion of the charge, and the series of coacting burners located in the combustion-chamber are arranged and operated for concentrating the flames thereof against and through said grate for thereby fusing down said grate and stabilizing (by heating) the mid-portion of the charge while this portion is supported by the fusible grate. The effect of these operations is to stabilize to a self-supporting condition, (as against gravity and the pressure of the charge), said mid-portion of the charge by projecting heating flames through the perforations of the grate, and finally the fusing flames will be increased to the point of melting down the grate, after which the smelting operation will normally proceed in the continuous manner already described.

During a continued operation of the furnace, and also owing to the features above indicated, and also owing to the oppositely inclined arrangements of the fusing jets delivered through a pair of burners, as H, the fusing jets coming together on about the middle line, of the furnace naturally mingle together and are forced upwardly through said bottom opening J and thus coact together and operate with the greatest intensity in a focal zone immediately surrounding the focal point at P so that in practice the material forming the lower part of a charge will be fused or eaten away and thus leave the extremely lower end of the charge free for the two side portions thereof to gradually close together toward the said focal zone, this action occurring by a sliding movement of the combined material with a turning or shifting effect, whereby the said side portions of the charge slide downwardly and inwardly toward each other by a movement inwardly upon the parabolically-curved bottom walls. During this normal operation of the furnace should one of the side portions of the charge move downwardly with a greater velocity than the opposite side portion of the charge, such more rapidly descending portion will naturally be fused or eaten away as it comes to the fusing zone, or focal zone, and thus by a normal action within the mass of the charge cause the opposite portion of the material to move downwardly with a greater force and rapidity and thereby, automatically as it were, restore the balanced and relatively uniform progressive downward movement of the entire charge, and, also, do this with a minimum disturbance or irregularity of movement of the material within the different portion of the mass. The said several portions of the material and the coöperative fusing flames therefore coact together for the maintenance of the complete operation in a continuous manner and with a maximum degree of efficiency.

The foregoing arrangements and modes of action also provide for a further object and result which is regarded as particularly important for the maintenance of the furnace in constant operation at a substantially uniform rate of action and with the requisite degree of efficiency notwithstanding irregularity in the mixture of the material and the occasional presence in the charge of a mass of a relatively infusible or slowly fusible ores or other mineral. For instance, should an exceptionally obstinate or refractory mass become projected downwardly into or through the bottom opening J, the two burners, as H, will then operate individually as blow-pipe fusing devices directly upon such protruding mass, while the downward movement of the charge,—immediately above such obstructed point,—is temporarily halted through the obstruction of the said bottom opening as against the upwardly moving combined flames of the two burners. Thus said burners may be said to operate somewhat individually, while acting with a combined effect upon such protruding obstacle or mass, which is thus fused and eaten away by a most intense action, since the two flames are then concentrated at a point considerably below the normal focal point of the upper fusing zone. On the reduction and disposal in this manner of any such obstruction, the two flames normally meet again and combine into an upwardly moving fusing flame which will gradually fuse or eat away such material as may in the meantime come to occupy the normal fusing zone, and in this manner gradually but rapidly restore the furnace to its proper mode of action and to the gradual bringing down of the charge in the more regular and normal manner already set forth.

The improved means which I have devised for "blowing-up," or inaugurating the operation of the smelting furnace, consists of a support which permits the fusing-flames to pass into the charge, while being itself reduced or melted out. The fusible or analogous support is inserted across the hearth-opening, and has perforations or spaces through which the flames may pass upwardly into the charge and thus partially fuse, or make adhesive, a lower layer of the ore before the support or grate falls down. One suitable form of such a support is shown in section at G, Fig. 4, and may be in the form of a grate having sidebars 7ª, inclined upwardly and centrally connected with one another. After starting the burners, the air pressure should be raised to a point for getting a high intensity of a heat, sufficient to melt out the said support, but not to do this until after the material directly above shall have been heated at least to the point of incipient fusion. In this way the material may be said to be stabilized in that part of the charge which is directly over the hearth-opening, which thus, by a partial fusion, is made sufficiently self-supporting to bridge-across,—as by an arch,—from the hearth-wall on the one side, to the hearth-wall on the other side, and thereby prevent a premature settling down of the charge. A further improvement is to make the said initial load-supporting member, as G, of a "slag" composition which, on melting, will mingle with the slag from the charge and so avoid any adverse metallurgical effects. In practice, such supports may be made in one or several pieces, and also may be cast into suitable form.

It is noted that the hearth opening is wide relative to its depth, thus permitting the flames from the burners, after they are combined to be projected upwardly far into the charge. Taking the focal point $p$ as a center, the arc occupied by the hearth opening is substantially one-fourth of a circle; but in practice this arc may vary greatly, but preferably should be between one-fifth and three-fifths of a circle.

The inclination of the hearth wall near the hearth opening substantially coincides with the normal angle-of-repose of the charge-material upon the metal surface of the hearth-wall. By this arrangement of hearth-wall and hearth-opening, there is provided effective support for the charge while the lower and outside portions slide downwardly and inwardly during the fusing out of the mid-portion of the base of the charge.

By care in replenishing the charge, and from time to time observing the upper surface thereof, the furnace attendants can readily discover the existence and the location of any considerable obstruction in the hearth-opening by noting the inequalities in the descent of the charge in different portions thereof, so that,—in accordance with an experience readily gained in operating upon any particular character of material,—they may from time to time vary the relative burden and downward pressure upon different portions in the length of the hearth-walls, by suitably varying the heights of the respective portions of the charge. Similarly, in the absence of any such obstruction, the attendants may ascertain by means of such observations in what part of the length of the hearth the normal progress of the smelting operation is proceeding most rapidly, so that the supply of air and fuel to the respective pairs of burners may be properly regulated from time to time as found desirable for equalizing or suitably regulating the rate of ore-reduction throughout the length of the furnace.

I claim:

1. In a smelting furnace, the combination of a charge chamber having its lower part inwardly inclined to form a hearth adapted to support the charge, and provided at its lower part with a hearth-opening having a width several times greater than its vertical depth; and a plurality of inwardly projected upwardly inclined jet burners adapted to project their combined flame upwardly through said opening and into the interior of the lower part of the charge.

2. In a smelting furnace, the combination of an upper charge chamber having its lower part inwardly curved to form a hearth of parabolic vertical section adapted to support the charge and provided at its lower part with a central hearth-opening having a width several times greater than its vertical depth; and a plurality of inwardly projected upwardly inclined burners adapted to combine their flames within said opening, and to project their combined flame upwardly through said opening to and above the focal point of the parabolic curvature of the hearth.

3. In a smelting furnace, the combination of a charge chamber having a hearth provided with a hearth-opening; and inwardly projected upwardly inclined jet burners having their extended axes intersecting within said opening, whereby the flames of said burners are adapted to combine within said opening and to project their combined flame upwardly into the chamber and into the base or lower part of the charge.

4. In a smelting furnace, the combination of a charge chamber having its lower part inwardly curved to form a hearth, provided at its lower part with a wide central hearth-opening; and pairs of oppositely disposed inwardly projected upwardly inclined jet burners having their extended axes intersecting within said opening, whereby the flames of said burners are adapted to combine within said opening and to project their combined flame upwardly through said opening to a point above the floor of said hearth.

5. In a smelting furnace, the combination of a charge chamber having its lower part inwardly curved to form a hearth provided at its lower part with a hearth-opening; and inwardly projected upwardly inclined burners adapted to combine their flames within said opening and to project their combined flame upwardly through said opening, the extended axes of said burners passing through said hearth opening free of contact with any part of the floor or wall thereof.

6. In a smelting furnace, the combination of a charge chamber having its lower part inwardly curved to form a hearth provided at its lower part with a wide central hearth-opening; and pairs of oppositely disposed inwardly projected upwardly inclined jet burners adapted to combine their flames within said opening and to project their combined flame upwardly through said opening to the interior of the base or lower part of the charge, the extended axes of said burners passing through said hearth-opening entirely free from contact or intersection with any part of the floor or wall thereof or the lower part of said hearth in order to prevent the flame impinging upon or damaging any of such parts should any flame of a pair be left burning alone.

7. In a smelting furnace, the combination of a charge chamber having its lower part inwardly curved to form a hearth provided at its lower part with a central hearth-opening; and jet burners adapted during normal operation of the furnace to project the hottest part of their combined flame upwardly through said opening to and above the level of the upper part of said hearth, thereby to form fusion and plastic zones, the ore surrounding said zones being comparatively firm at the upper part and gradually increasing in plasticity downwardly; the steepness of said hearth so decreasing downwardly, as the plasticity of the ore increases, as to so decrease the inward force upon the ore and to give such support and inward movement to the ore, at substantially all parts of the hearth, and will cause an even downward and inward movement of the ore, without pocketing, as fast as the ore is melted out.

8. A process consisting in heating an intralateral part of a charge of ore to form a fusion zone surrounded by a plastic zone surrounded by a heated zone; and introducing to said heated zone air having a normal and natural oxygen content.

9. A process consisting in injecting into the interior of the base of a charge of ore, flame adapted to form therein a fusion zone surrounded by plastic and heating zones; while introducing an oxidizing medium of maximum normal and natural oxygen content to and around said heated zone; and supplying to said flame only enough combustion supporting medium to form a flame of maximum intensity.

10. A process consisting in projecting an intense melting flame upwardly into a charge of ore with its hottest part above the base of the charge and thereby forming a fusion zone having a height substantially as great as its width located within the base of such charge and surrounded by a plastic zone in turn surrounded by a heated zone; gradually moving the lower part of said ore inwardly to said zones as the ore is melted down and out; and supplying oxidizing medium of maximum normal atmospheric content to said heated zone and above the level of the supporting hearth.

11. A process consisting in projecting an intense melting flame upwardly into a charge of ore and thereby forming a fusion zone having a depth substantially as great as its width; moving the ore of the lower part of said charge inwardly to said zones as the ore is melted out; and supplying to said heated zone and to the surrounding ore, oxidizing air having a normal natural oxygen content.

12. A process consisting in projecting an intense melting flame upwardly into a charge of ore and thereby forming a substantially spherical fusion zone having a height substantially greater than its width and surrounded by a plastic zone in turn surrounded by a heated zone; supporting the lower part of the charge so as to gradually and evenly move the ore of said lower part inwardly to said zones as the ore is melted out; and supplying to all parts of said heated zone and to the surrounding ore, heated oxidizing air having a normal natural oxygen content.

13. In a smelting furnace, the combination of a charge chamber; a water jacket adjacent to said charge chamber; flues adjacent to the water of said jacket; means for feeding air into said flues, thus cooling the water and at the same time heating the air simultaneously; and exterior burners for heating the interior of said charge chamber and fed with said heated air.

14. In a smelting furnace, the combination of a charge chamber; a water jacket adjacent to and surrounding said charge chamber; flues in said jacket; means for feeding air into said flues, thus cooling the water and heating the air simultaneously; and burners directing flame into said charge chamber and fed with said heated air.

15. In a smelting furnace, the combination of a charge chamber having an opening; and a fusible member placed temporarily over said opening, for the purposes stated.

16. In a smelting furnace, the combination of a charge chamber having an opening; and a fusible member forming a temporary closure for said opening.

17. In a smelting furnace, the combination of a charge chamber having a hearth opening; a fusible grate placed temporarily over said opening; and means for fusing the grate.

18. In a smelting furnace, the combination of a charge chamber having a hearth opening; a fusible grate over said opening; and means adapted first to fuse a portion of the charge and then to melt out the grate.

19. In a smelting furnace, the combination of a charge chamber; a water jacket adjacent to said charge chamber; flues adjacent to said jacket; means for feeding air into said flues, thus cooling the water and heating the air simultaneously; exterior burners for heating the interior of said charge chamber; and means for utilizing said heated air for oxidizing the ore of said charge and feeding said burners.

20. In a smelting furnace, the combination of a charge chamber; a water jacket adjacent to said charge chamber; flues adjacent to said jacket; means for feeding air into said flues thus cooling the water and heating the air simultaneously; exterior burners fed with said heated air for heating the interior of said charge chamber; and means for utilizing said heated air for oxidizing the ore of said charge.

21. A smelting process consisting in injecting, into a charge of ore, flame forming therein a fusion zone surrounded by a plastic zone in turn surrounded by a heated zone; and introducing oxidizing air of maximum normal oxygen content to and around said heated zone, thereby oxidizing the ore of the heated zone before and in anticipation of its reaching the plastic and melting zones.

22. A smelting process consisting in forming in the interior of the charge well above the base thereof a spherical fusion zone; forming a plastic zone around the fusion zone; forming a heated zone around the plastic zone; and introducing oxidizing air to and around said heated zone.

23. A smelting process consisting in confining a charge of ore; projecting the hottest part of a melting flame into the interior of the charge well above the base thereof, and thereby forming, well above said base, a substantially spherical fusion zone, a plastic zone around the fusion zone and a heated zone around the plastic zone; and introducing oxidizing air to and around and partly under said heated zone.

24. A smelting process consisting in confining a charge of ore; projecting the hottest part of a melting flame into the interior of the charge well above the base thereof, and thereby forming well above said base, a spherical fusion zone, a plastic zone around the fusion zone, and a heated zone around the plastic zone; introducing oxidizing air to and around and partly under said heated zone; and gradually moving the lateral parts of the charge laterally inward as the material of the fusion zone is melted out.

25. A smelting process consisting in forming a fusion zone in the interior of the charge; forming a plastic zone around the fusion zone; forming a heated zone around the plastic zone; introducing combustion supporting air to said flame; and heating said supporting air from the heat of the charge before the air reaches the flame.

26. A smelting process consisting in forming a fusion zone in the interior of the charge, well above the base thereof; forming a plastic zone around the fusion zone; forming a heated zone around the plastic zone; introducing combustion supporting air to said flame; and heating said supporting air from the heat of the charge by passing the supporting air in close proximity to the charge before the air reaches the flame.

27. A smelting process consisting in confining a charge of ore; projecting the hottest part of a melting flame into the interior of the charge well above the base thereof, and thereby forming, well above said base, a fusion zone, a plastic zone around the fusion zone and a heated zone around the plastic zone; introducing combustion supporting air to said flame; and heating said supporting air from the heat of the charge by passing the supporting air in close proximity to the charge before the air reaches the flame.

28. A smelting process consisting in forming a fusion zone in the interior of a charge well above the base thereof; forming a plastic zone around the fusion zone; forming a heated zone around the plastic zone; introducing oxidizing air of normal maximum oxygen content to and around said heated zone; and heating said oxidizing air by the heat of the charge, before said air reaches the heated zone, by passing the air in close proximity to the charge.

29. A smelting process consisting in confining a charge of ore; projecting the hottest part of a melting flame into the interior of the charge well above the base thereof, and thereby forming, well above said base, a fusion zone, a plastic zone around the fusion zone and a heated zone around the plastic zone; introducing oxidizing air of normal maximum oxygen content to and all around said heated zone; and heating said oxidizing air by the heat of the charge, before said air reaches the heated zone, by passing the air in close proximity to the charge.

30. A smelting process consisting in confining a charge of ore; projecting the hottest part of a melting flame into the interior of the charge well above the base thereof, and thereby forming, well above said base, a spherical fusion zone, a plastic zone around the fusion zone and a heated zone around the plastic zone; introducing oxidizing air of normal maximum oxygen content to and around and partly under said heated zone; heating said oxidizing air by the heat of the charge, before said air reaches the heated zone, by passing the air in close proximity to the charge; introducing combustion supporting air to said flame; and heating said supporting air from the heat of the charge by passing the supporting air in close proximity to the charge before the air reaches the flame.

31. In a smelting-furnace of the character described, in combination, an upper charge-chamber; a lower combustion chamber; a horizontally-disposed furnace-hearth interposed between said upper and lower chambers, consisting of an annular charge-supporting and transversely-curved metal-surface, constituting a hearth-wall, located in substantial coincidence with symmetrically and oppositely disposed arcs, and having between them a hearth-opening, said wall also having a narrow inner zone tangential to a line which substantially coincides with the normal angle-of-repose of the material resting thereon.

32. In a smelting-furnace of the character described, in combination, an upper charge-chamber; a lower combustion chamber; a horizontally-disposed furnace-hearth interposed between said upper and lower chambers, consisting of an annular charge-supporting and transversely-curved metal-surface, constituting a hearth-wall located in substantial coincidence with symmetrically and oppositely-disposed arcs of a parabola, and having between them a hearth-opening occupying substantially a mid-arc of the same parabola, and corresponding with an arc of substantially one-fourth of a circle, said wall also having a narrow inner zone tangential to a line which substantially coincides with the normal angle-of-repose of the material resting thereon.

33. In a smelting-furnace of the character described, the combination with a charge-chamber, of a furnace-hearth comprising charge-centering bottom walls having between them a hearth-opening, a series of burners arranged in pairs which are located transversely of the hearth-opening at successive positions, respectively, in the length thereof, and in which the two burners of a pair are arranged in transverse positions relatively to each other and are directed upwardly and to a common point below said hearth-opening, for combining the flames from the two burners within and above said hearth-opening, and means for separately adjusting and regulating the position of the combined flame of any pair of such burners and projecting this flame upwardly through the hearth-opening into the fusing-zone above said hearth-opening.

34. In a smelting-furnace of the character described, the combination with a charge-chamber, of a furnace-hearth comprising an annular charge-centering bottom wall having centrally thereof a hearth-opening, a series of burners arranged in pairs which are located transversely of the hearth-opening, and in which the two burners of a pair are arranged in transverse positions relatively to each other and are directed to a common point below said hearth-opening for combining the flames from the two burners within and above said hearth-opening, and means for regulating the operation of any pair of burners by adjusting one of said burners relatively to the other, and thereby projecting the combined flame upwardly through the hearth-opening into the fusion-zone above said hearth-opening, and for regulating the intensity of the flame in said fusion-zone.

35. In a smelting furnace, the combination of a charge chamber; means for forming a flame extending from beneath into the charge chamber; and means for varying the position of the flame.

36. In a smelting furnace, the combination of a charge chamber; and a plurality of separately adjustable burners so focused and adapted as to combine their jets to form a flame directed and extending upward and into the charge chamber.

37. In a smelting furnace, the combination of a charge chamber; a hearth at the lower part of the chamber having a central opening; a plurality of fluid jet burners focused below said opening and adapted to combine their jets to form a flame extending upward and into the charge chamber; and means for separately adjusting said burners to vary the intensity and volume of said jets and flame and the position of the flame.

38. In a smelting furnace, the combination of a charge chamber; an inwardly curved hearth at the lower part of the chamber having a central opening; a plurality of upwardly inclined and inwardly directed fluid jet burners focused below said opening and adapted to combine their jets to form a flame directed and extending into the charge chamber to fuse the charge; and means for separately adjusting said burners to vary the intensity and volume of said jets and flame and the position of the flame.

39. In a smelting furnace, the combination of a charge chamber; an inwardly curved hearth at the lower part of said chamber, provided with an opening; a combustion chamber located beneath said opening, having overhanging walls; and a plurality of fluid jet burners terminating beneath said wall, focused below said opening and adapted to combine their jets to form a flame directed and extending upwardly into said charge chamber.

40. In a smelting furnace, the combination of an upper charge chamber; lower combustion chamber; a fusible grate resting upon the hearth and over the opening located between said charge and combustion chambers, to temporarily support the charge over said opening; and a plurality of upwardly inclined and inwardly directed fluid jet burners terminating and focused below said opening and adapted to combine their jets to form a flame directed and extending axially and upwardly into said charge chamber so as to partially fuse said charge and make it self-supporting before melting out said grate.

41. In a smelting furnace, the combination of a charge chamber; an inwardly curved hearth at the lower part of the chamber having an opening therein; a fusible grate over said opening; and fluid jet burners terminating and focused below said opening and adapted to form a flame to partially fuse the charge so as to form a support therefor and then to melt out said grate.

42. In a smelting furnace, the combination of a charge chamber; a fusible grate, and means for forming a flame to partially fuse the charge so as to form a support therefor and then to melt out said grate.

43. In a smelting-furnace of the character described, in combination, an upper charge-chamber; a lower combustion chamber; a horizontally-disposed furnace-hearth interposed between said upper and lower chambers, and comprising an annular charge-supporting and charge-centering hearth-wall symmetrically and oppositely-disposed and having centrally thereof a hearth-opening, a fusible charge-supporting grate extending over said hearth-opening for initially supporting the charge, and a series of coacting burners located in the combustion-chamber and arranged for stabilizing by heating the mid-portion of the charge while supported by said fusible grate, and for then melting down said grate.

44. In a smelting-furnace of the character described, in combination, an upper charge-chamber; a lower combustion chamber; a horizontally-disposed furnace-hearth interposed between said upper and lower chambers, and comprising a charge-supporting and charge-centering hearth-wall having a central hearth-opening; a fusible charge-supporting grate extending over said hearth-opening for initially supporting the charge; and, a series of coacting burners located in the combustion-chamber and arranged for concentrating the flames thereof upward and against the underside of said grate for thereby melting down said grate and stabilizing by heating the mid-portion of the charge while supported by said fusible grate.

45. In a smelting-furnace of the character described, in combination, an upper charge-chamber; a lower combustion chamber; a horizontally-disposed furnace-hearth interposed between said upper and lower chambers, and comprising an annular charge-supporting and charge-centering hearth-wall symmetrically disposed and having centrally thereof a hearth-opening; a fusible charge-supporting member extending over said hearth-opening for initially supporting the charge; fusing means located in the combustion chamber and arranged for stabilizing by heating a mid-portion of the charge while supported by the fusible member, and for then melting down said fusible member; and, hearth-cooling means arranged for resisting the overheating of the hearth during the melting down of said fusible member, and thereafter during the continued operation of smelting.

46. In a smelting furnace, the combination of a charge chamber; a water jacket adjacent to and surrounding said charge chamber; two air chambers; flues in said jacket connecting said air chambers; means for feeding air into one of said air-chambers, through said flues into the outer air-chamber, thus cooling the water and heating the air simultaneously, and burners directing flame into said charge chamber and fed with such heated air.

47. In a smelting furnace, the combination of a charge chamber; a water jacket adjacent to and surrounding said chamber; two air chambers; flues in said jacket connecting said air chambers; means for feeding air into one air-chamber; and oxidizing air twyers directed into the base of said charge chamber and fed with heated air taken from the second of said air chambers.

48. In a smelting furnace, the combination of a charge chamber; a combustion chamber; a water jacket surrounding the chambers; two air chambers; flues in said jacket and connecting said air chambers; means for feeding air to one of the air chambers and burners directed into the combustion chamber and fed with heated air from the other air chamber.

49. In a smelting furnace, the combination of a charge chamber; a combustion chamber; a water jacket surrounding the chambers; two air chambers; flues in said jacket connecting said air chambers; means for feeding air to one of said chambers and oxidizing air twyers directed into the base of said charge chamber and fed with heated air from the other chamber.

50. In a smelting furnace, the combination of a charge chamber; a combustion chamber beneath the charge chamber; a water jacket surrounding the chambers; two air chambers; flues in said jacket connecting said air chambers; an outer chamber surrounding and constituting a part of one of said air chambers; and oxidizing air twyers directed into the charge chamber and fed with heated air from said outer chamber.

51. In a smelting furnace, the combination of an upper charge chamber; a combustion chamber located beneath said charge chamber; a water jacket surrounding said charge and combustion chambers; two air chambers; flues in said jacket connecting said air chambers; an outer chamber surrounding and constituting a part of one of said air chambers; burners directed into the combustion chamber and fed with heated air from said outer chamber; and oxidizing air twyers directed into the charge chamber and fed from said outer chamber.

52. In a smelting furnace, the combination of an upper charge chamber; a combustion chamber located beneath said charge chamber; a water jacket surrounding said charge and combustion chambers; two air chambers; flues in said jacket connecting said air chambers; an outer chamber surrounding and constituting a part of one of said air chambers; and burners directed into the combustion chamber and fed with heated air from said outer chamber.

53. In a smelting furnace, the combination of a frame work forming a charge chamber, a combustion chamber located beneath said charge chamber and a water jacket surrounding said chambers; air chambers located respectively above and below said jacket; vertical flues in said jacket connecting said air chambers; an outer annular chamber communicating with the lower of said air chambers; means for feeding air to the upper chamber; burners directed into the combustion chamber and fed with heated air from said outer chamber; and oxidizing-air twyers directed into the base of said charge chamber and fed with heated air from said outer chamber.

54. In a smelting furnace, the combination of a frame work forming a charge chamber having a lower hearth, and a combustion chamber located beneath said charge chamber and hearth; said frame work comprising inner and outer shells or walls forming therebetween a water jacket surrounding said charge and combustion chambers; upper and lower annular air chambers respectively above and below said jacket; vertical flues in said jacket and connecting said annular air chambers; an outer annular chamber surrounding the lower part of said jacket and constituting a part of said lower air chamber; means for feeding air to the upper chamber; burners directed into the combustion chamber and fed with air from said outer chamber; and oxidizing-air twyers directed into the base of the charge chamber above said hearth and fed with heated air from said outer chamber.

55. In a smelting furnace of the character described, in combination, a framework having two-plate walls with an interior space for containing and circulating a liquid cooling fluid, and inclosing an upright circular charge chamber having a charge-centering upper hearth-wall of concave transverse construction and extending in a circuit around and within the charge-chamber and around a central hearth-opening, and having the interior thereof in communication with said interior space of the framework; means in position and arranged for supplying air-jet burner flames combined into fusing-flames and projecting upwardly through said hearth-opening into a fusing-zone located within said charge-chamber, air chambers heading and partially surrounding, and air flues passing through said liquid cooling fluid for the purpose of cooling the water and, at the same time, of heating the air preparatory to its passage through the burners and oxidizing twyers; and means for conducting said heated air from said chambers to said air-jet burners and oxidizing air twyers.

56. A smelting process comprising the focusing of a plurality of flame jets whereby said jets combine to form an intense flame which is directed toward the center and interior of a charge at its base; thereby fusing out a core in the base of the charge; the intensity of said jets being varied by changing the position and volume of said flame.

57. A smelting process consisting in confining a charge of ore with a fusible grate; partially fusing the charge; and then fusing out the grate, and thereafter proceeding to smelt.

58. A smelting process consisting in confining a charge of ore; supporting said charge with a fusible grate; partially fusing the charge; and then fusing out the grate before proceeding to smelt.

59. A blowing in process consisting in confining a charge of ore; placing a fusible grate at the lower part of the charge; partially fusing the lower part of the charge; then fusing out the grate; and thereafter continuing the operation of smelting.

RANDOLPH G. WARD.

Witnesses:
H. M. KILPATRICK,
H. D. PENNEY.